United States Patent [19]

Mita

[11] 4,399,956
[45] Aug. 23, 1983

[54] LOCKING DEVICE FOR THE WEBBING FOR SEAT BELT

[75] Inventor: Akira Mita, Fujisawa, Japan

[73] Assignee: Nippon Seiko Kabushiki Kaisha, Tokyo, Japan

[21] Appl. No.: 308,397

[22] Filed: Oct. 5, 1981

[30] Foreign Application Priority Data

Oct. 11, 1980 [JP] Japan ................................. 55-142250

[51] Int. Cl.³ ....................... A62B 35/02; B65H 75/48
[52] U.S. Cl. ............................ 242/107.2; 242/107.4 A
[58] Field of Search ...................... 242/107.2, 107.4 R, 242/107.4 E; 280/803, 806–808; 297/476–480

[56] References Cited

U.S. PATENT DOCUMENTS 3,817,473 6/1974 Board et al. ..................... 242/107.2
4,128,261 12/1978 Paitula .
4,181,273 1/1980 Adomeit ........................... 242/107.2
4,249,708 2/1981 Asano ............................... 242/107.2

Primary Examiner—John M. Jillions
Attorney, Agent, or Firm—Wyatt, Gerber, Shoup, Scobey & Badie

[57] ABSTRACT

In a retractor wherein webbing is drawn out from a take-up spool and extends partially around a drum, a locking device for the webbing for the seat belt is provided with a sensor for sensing sudden acceleration or deceleration exerted on a vehicle body. A first restraining pawl is moved by the sensor to a position preventing rotation of the spool. A second restraining pawl is driven by a tilting member to prevent rotation of the drum, and a frictional restraining member for pressing the webbing is provided on the base of the drum in a position opposed to a fixed frictional restraining member provided on the base of the retainer.

3 Claims, 3 Drawing Figures

LOCKING DEVICE FOR THE WEBBING FOR SEAT BELT

BACKGROUND OF THE INVENTION

1. Field of the Invention

This invention relates to a locking device for the webbing for a seat belt in an automotive vehicle.

2. Description of the Prior Art

Nowadays, it is commonly practised that the webbing of a seat belt is drawn out from a retractor and placed across the body of a seat occupant during driving of an automotive vehicle. When the seat occupany moves his body, it is necessary that the webbing can be further drawn out from the retractor or rewound in response to that movement so that the seat occupant may not undergo a sense of strong oppression, but when a sudden shock or acceleration or deceleration is exerted on the vehicle body to suddenly impart a strong force to the seat occupant, it is necessary that the withdrawl of the webbing from the retractor be stopped to prevent the seat occupant from being thrown forward.

SUMMARY OF THE INVENTION

The present invention intends to provide, in a retractor which enables the webbing of a seat belt to be drawn out from a take-up spool through a drum, a sensor operative upon sensing a sudden shock or acceleration or deceleration exerted on the vehicle body and prevents not only rotation of the spool and the drum round which the webbing extends during these emergencies but also prevents the webbing from being drawn out due to the webbing being tightened on the take-up spool when the webbing is strongly pulled when the rotation of the take-up spool is prevented.

For this purpose, in the present invention, means for preventing rotation of the drum round which the webbing extends is provided in addition to the conventional means for preventing rotation of the take-up spool and further, a drum base supporting this drum is rockably supported on the base of the retractor at a point eccentric relative to the drum shaft. Therefore, when, during emergency, the webbing is pulled more strongly with the rotation of the take-up spool and drum being prevented, the drum base is moved relative to the base to press the webbing between a restraining member provided on the drum base and a restraining member provided on the base to prevent draw-out of the webbing resulting from the tightening thereof.

The invention will become more fully apparent from the following detailed description thereof taken in conjunction with the accompanying drawings.

DESCRIPTION OF THE PREFERRED EMBODIMENT

Figure 1:
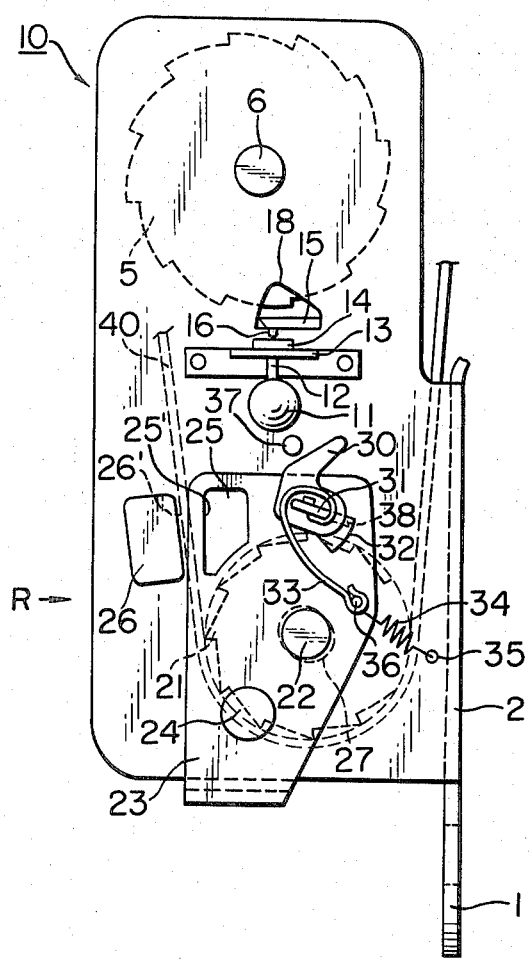
FIG. 1 is a side view of the device of the present invention.
Figure 2:
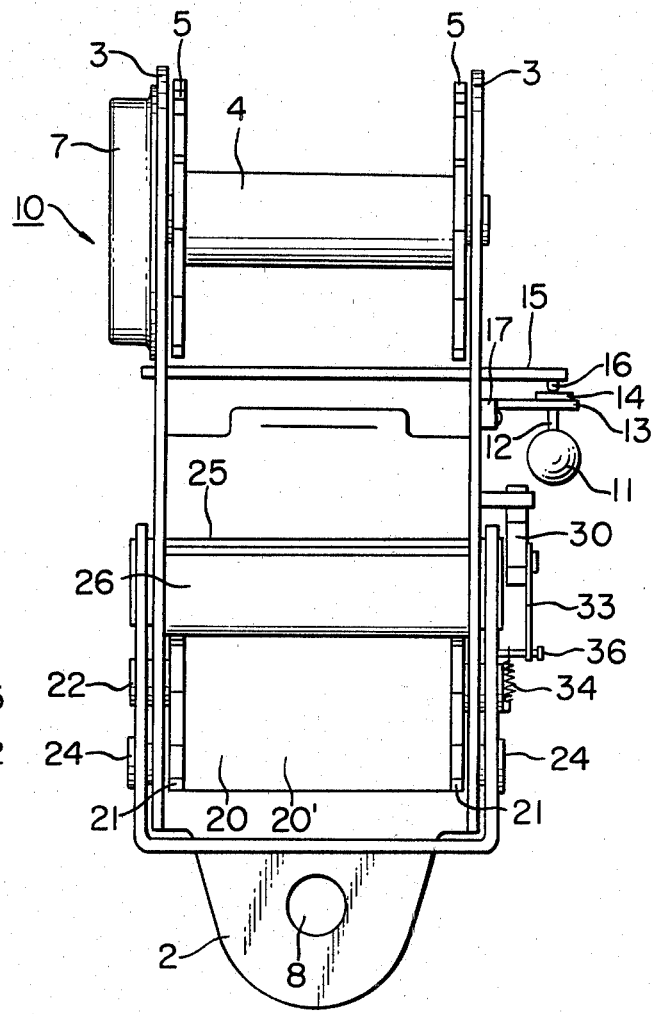
FIG. 2 is a front view of the device as seen in the direction of arrow R of FIG. 1.

Referring to the drawings, a retractor 10 having the locking device for a seat belt according to the present invention has its various elements attached to a base 1. The base 1 comprises a bottom 2 and opposite side walls 3, 3. A take-up spool 4 is interposed between the side walls and first latches 5 and 5 formed by respective ratchet wheels are attached to the opposite ends of the take-up spool. Designated by 6 is the shaft of the take-up spool which is biased in a direction to take up the webbing of the seat belt (clockwise direction in FIGS. 1 and 3) by a spring in a spring housing 7 attached to one side wall 3. Designated by 8 is a mounting hole for mounting the base 1 to a vehicle body.

Reference numeral 11 designates a sensor for sensing any sudden change of speed of the vehicle body, and reference numeral 12 denotes the shaft of the sensor which extends through a support plate 13 mounted by means of a mounting portion 17. The upper end of the shaft 12 provides a flattened head 14. A first restraining pawl 15 is provided above the shaft 12, and a projection 16 provided on one end of the pawl 5 is in contact with the flattened head 14.

The first restraining pawl 15 is positioned in a sector-shaped first escape holes 18 formed in the side walls 3, 3. The first restraining pawl 15 is normally located in the lower portion of the sector-shaped first escape holes 18 due to its mass and the sensor also depends downwardly from the pawl 15.

The webbing 40 is paid away from the take-up spool 4 and extends partially around a drum 20. Second latches 21 and 21, also formed by respective ratchet wheels, are attached to the opposite ends of the drum 20. A drum shaft 22 extends through slots 27 formed in the side walls 3 of the base 1 and is attached to a drum base 23. The drum base 23 is rockably mounted on the side walls 3, 3 of the base 1 by pivot shafts 24, 24 at a position eccentric relative to the shaft 22. A frictional restraining member 25 is provided inside the drum base 23 and in opposed relationship therewith, a fixed frictional restraining member 26 is provided inside the side walls 3, 3 of the base, and the webbing 40 passes between the members 25 and 26.

A second restraining pawl 38 extends through a sector-shaped second escape hole 32 formed in the drum base 23 and escape holes (not seen in the drawings) formed in the side walls of the base 1, and a tilting member 30 is secured to the end 31 of the second restraining pawl 38 which is projected outwardly of one side of the drum base 23. A first spring 33 is mounted between the end 31 and a spring restraining portion 36 provided on the drum base 23 and biases the second restraining pawl 38 in a direction so that it does not mesh with the second latches 21 attached to the opposite ends of the drum 20.

A second spring 34 is interposed between the restraining portion 35 of one side wall 3 of the base and the restraining portion 36 of the drum base. Thus, the drum base is normally biased clockwisely about a pivot shaft 24 by the spring 34. Designated by 37 is a stopper for the tilting member. The stopper 37 is formed as a projection extending from the outer side of one side wall 3, and the function thereof will be described later.

Operation will now be described. The webbing 40 is wound on the take-up spool 4 and drawn out by turning around the drum 20. As previously mentioned, the take-up spool 4 is normally biased in a webbing take-up direction (clockwise direction in the drawings) by the spring in the spring housing 7. The seat occupant draws out the webbing against the biasing force of that spring and places it in position. At this time, the take-up spool is rotated counter-clockwisely against the biasing force.

Figure 3:
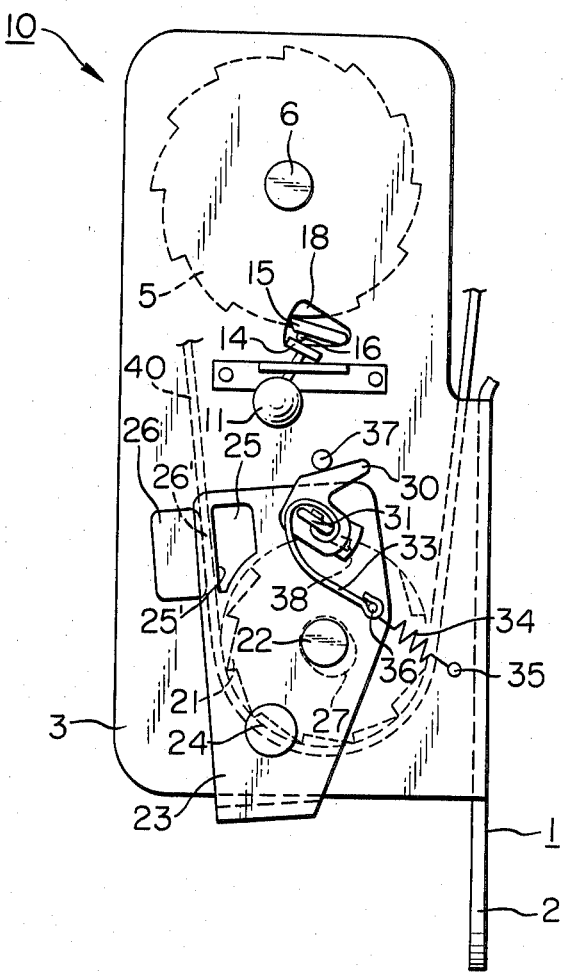
FIG. 3 is a side view showing the operative condition of the device.

When a sudden acceleration or deceleration is exerted on the vehicle body and the seat occupant is about to be thrown forward, the webbing is suddenly drawn out from the take-up spool. However, the sudden acceleration or deceleration exerted on the vehicle body is sensed by the sensor 11, which thus becomes inclined as shown in FIG. 3 and whose flattened head 14 pushes the projection 16, so that the restraining pawl 15 becomes inclined upwardly in the escape hole 18 and comes between the teeth of the first latches 5 to prevent rotation of the first latches 5, namely, to prevent counter-clockwise rotation of the take-up spool 4. Thus, the webbing is placed under tension and continued force exerted on the webbing causes the drum base 23 to rotate counter-clockwisely about the pivot shafts 24, 24 against the force of the second spring 34.

At the same time, the tilting member 30 supported by the first spring 33 tends to be moved leftwardly. At that time, the upper side of the tilting member 30 abuts against the stopper 37 and therefore, the tilting member itself rotates clockwisely about the stopper and the second restraining pawl 38 attached to the tilting member is also rotated clockwisely in the escape holes formed in the drum base and the side walls of the base (as previously mentioned, only the escape hole 32 formed in the drum base 23 is seen in the drawings), and the restraining pawl 38 meshes with the second latches 21 attached to the opposite ends of the drum 20, thereby preventing rotation of the drum 20. Therefore, when the webbing 40 is pulled further strongly so that it tends to tighten about the take-up spool 4 and is about to be further drawn out, the webbing pushes the drum 20 to the left and the drum shaft 22 can move along the slots 27 in the side walls 3 of the base, so that the drum base 23 further rocks counter-clockwisely about the pivot point 24 against the force of the second spring 34 and the webbing 40 is pressed between the frictional surface 25' of the frictional restraining member 25 provided on the drum base and the frictional surface 26' of the fixed frictional restraining member 26 provided on the side walls 3, 3 of the base 1, thus preventing the any further drawing out of the webbing resulting from the tightening.

The frictional surfaces 25' and 26' of the restraining members 25 and 26, respectively, and the surface 20' of the drum, if formed into a construction of greater friction with respect to the webbing or a construction of greater webbing pinching effect, for example, suitably roughened surfaces or resin- or rubber-coated surfaces, could further increase the effect of preventing the webbing from being further drawn out as it tightens about the spool 4.

Thus, the present invention has provided a webbing locking device which is relatively simple in structure and reliable in operation.

I claim:

1. In a retractor for a seat belt used in a vehicle wherein a webbing of the seat belt may be drawn from a take-up spool and directed at least partially around a drum mounted rotatably to a drum base secured pivotally to said retractor along an axis offset eccentrically from the axis of rotation of said drum and wherein the webbing may normally be withdrawn from said take-up spool relatively freely so that it may comfortably engage the user; a locking means for locking the webbind during a sudden acceleration or deceleration of the vehicle, said locking means including a sensor for sensing sudden acceleration or deceleration of the vehicle, means including a first restraining element driven by said sensor for preventing rotation of said spool, means including a second restraining element carried by said drum base and driven during initial pivoting of said drum base caused by tension applied to said webbing after said spool has been prevented from rotating for preventing rotation of said drum, a fixed frictional restraining member fixed on the retractor and lying adjacent one side of the webbing, and a movable frictional restraining member carried by said drum base and located oppositely from the fixed frictional restraining member and adapted to be pressed firmly against the other side of the webbing as continued tension of the webbing urges the drum base to pivot further.

2. A locking means according to claim 1, said retractor including a projection fixed in position on said retractor, and said second restraining element including a tilting member formed integrally therewith and adapted upon initial pivotal movement of said drum base to be brought into engagement with said projection and turned thereby during continued movement of said drum base to bring said second restraining element into position for preventing rotation of said drum.

3. A locking means according to claim 2, including a spring element connected between said second restraining element and said drum base for urging said second restraining element out of its position preventing rotation of said drum.

* * * * *